United States Patent
Räke et al.

(10) Patent No.: US 7,024,888 B2
(45) Date of Patent: Apr. 11, 2006

(54) METHOD FOR CHANGING GLASS COMPOSITIONS IN MELTING INSTALLATIONS, AND CORRESPONDING MELTING INSTALLATION

(75) Inventors: Guido Räke, Rümmelsheim (DE); Volker Ohmstede, Mainz (DE); Michael Leister, Budenheim (DE); Sybill Nüttgens, Frankfurt (DE); Christoph Leuwer, Mainz (DE)

(73) Assignee: Schott Glas, Mainz (DE)

( * ) Notice: Subject to any disclaimer, the term of this patent is extended or adjusted under 35 U.S.C. 154(b) by 534 days.

(21) Appl. No.: 10/395,516

(22) Filed: Mar. 23, 2003

(65) Prior Publication Data
US 2005/0028560 A1 Feb. 10, 2005

(30) Foreign Application Priority Data
Mar. 28, 2002 (DE) .............................. 102 13 918

(51) Int. Cl.
*C03B 5/08* (2006.01)

(52) U.S. Cl. ................. 65/121; 65/134.5; 65/135.6; 65/145; 65/173; 65/335; 65/347; 65/355; 65/356; 373/27; 373/138

(58) Field of Classification Search ............... 65/121, 65/134.5, 135.6, 145, 171, 172, 173, 335, 65/347, 355, 356; 373/27, 138, 146, 147
See application file for complete search history.

(56) References Cited

U.S. PATENT DOCUMENTS

| | | | | |
|---|---|---|---|---|
| 1,183,696 A | * | 5/1916 | Thornburg | ................ 65/173 |
| 1,541,142 A | * | 6/1925 | Hilton et al. | ............... 65/173 |
| 1,596,058 A | * | 8/1926 | Mambourg | ............. 65/136.4 |
| 3,244,495 A | * | 4/1966 | Apple et al. | ............... 65/161 |
| 4,549,895 A | | 10/1985 | Izumitani et al. | |

* cited by examiner

*Primary Examiner*—Sean Vincent

(57) ABSTRACT

The invention relates to a method for changing glass compositions in continuously operated melting installations which has a significantly shortened melt changeover time and therefore lower costs and in which the glass quality is not adversely affected.

12 Claims, 3 Drawing Sheets

METHOD FOR CHANGING GLASS COMPOSITIONS IN MELTING INSTALLATIONS, AND CORRESPONDING MELTING INSTALLATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a method for changing glass compositions in continuously operated melting installations, in particular for aggressive, high-purity and/or high-melting glasses, and to a melting installation which is suitably modified for this method.

Hitherto, it has been attempted as far as possible to melt each (special) glass which is to be produced in a separate melting installation. Given the very high number of different types of glasses and the widely differing quantities to be melted, the result is a large number of melting installations, each of which requires a corresponding "infrastructure". Melting installations of this type are often not fully loaded.

It would inherently be less expensive to operate just a single melting installation for various types of glasses. This melting installation would have a significantly improved loading.

Conventional glass changes (generally melt changeover operations) in a melting installation have problems, since both the composition and the physical properties of glasses often have considerable differences. A particular problem with the melt changeover between two glasses consists, inter alia, in the difference in density between the starting glass A and the target glass B. The differences in density delay the melt changeover operation. It is known from the literature that considerable differences in density between starting glass A and target glass B lead to segregations in the melting tank. In this context, the melt changeover from a relatively heavy glass to a lighter glass is particularly critical, since there is a risk that the new glass will simply float on top of the old glass. The result is extremely long melt changeover operations, since the old glass A is not discharged sufficiently quickly from the crucible.

A further problem with melt changeover arises if the starting glass A and the target glass B have very different chemical compositions or belong to different "glass families". In this case too, segregation and/or devitrification (crystallization) phenomena may occur, and in the most serious circumstances these may not just delay the melt changeover but also make it impossible.

One possible way of avoiding or reducing the melt changeover problems which have just been outlined could involve simply draining the tank and filling it again and melting target glass. However, draining hot molten glass out of the tank involves risks which should be avoided for health and safety reasons. Secondly, particularly in the case of high-purity glasses, the purity demands are so high that even slight remaining glass residues from the starting glass A cannot be tolerated in the target glass B.

Aggressive glasses with a need for a high level of purity are conventionally melted continuously in platinum tanks which include a melting-down tank, a refining tank and a homogenization unit. This melting technology is disadvantageous on account of the high costs of the precious metal, the short service lives of platinum units of this type and the lack of flexibility. In addition to platinum melting-down units, the separate melting installations mentioned in the introduction also use what is known as the skull crucible, which is composed of water-cooled metal pipes arranged at a distance from one another and in which the molten material is heated by means of induction coils, which surround the crucible, by high-frequency energy being radiated in. Melting-down units of this type have the advantage that in the edge region of the crucible, on account of the water cooling, a glass crust is inevitably formed as a protective layer consisting of material of the same type, so that the molten material is surrounded in the form of a crucible "of the same type" and is thereby protected from impurities.

A glass change or the melt changeover between glasses using a skull crucible of this type is not mentioned in the literature. If the melt changeover processes which are conventionally carried out are to be executed in a skull crucible, it must be borne in mind that the glass crust of the crucible, at least in parts, has to be replaced by the target glass, which greatly lengthens the melt changeover operation.

The composition of the target glass is in practice continuously monitored and adjusted in order to maintain the desired specification of the glass. Particularly in the case of highly specific glasses, this adjustment process may take a very long time, for example, a melt changeover time of four days, which entails considerable costs on account of the intermediate glass which is lost.

SUMMARY OF THE INVENTION

The invention is therefore based on the object of providing a method for changing glass compositions in melting processes which can have a significantly shortened melt changeover time and therefore lower costs but without the glass quality being adversely affected. The object set is achieved by a method for changing glass compositions in continuously operated melting installations, comprising the following steps:
a) a number of mobile melting-down units are made available which correspond to the number of glasses to be produced with the glass composition desired in each case, known as the target glasses, which melting-down units are provided with coupling devices so that they can be connected to and disconnected from the melting installation, the melting-down units, after use, still having glass residues comprising the target glass in question, which is available once again for the next melting process with the same or a similar target glass;
b) the melting-down unit which has been selected in each case is used as part of the melting installation, the coupling devices of the melting-down unit being connected to those of the melting installation, in order to be able to carry out glass-melting operation and vessel-wall cooling, and a glass overflow is formed into a further processing system;
c) the contents of the melting-down unit which has been fitted into the melting installation is locally preheated in order to create a region of sufficient glass conductivity, in which electrical energy can be introduced;
d) the glass-melting operation with electrical energy being introduced is commenced with vessel-wall cooling taking place at the same time;

e) the contents of the melting-down unit are supplemented by a batch having the composition of the target glass, and the glass-melting operation in accordance with step d) is continued in order to produce target glass and in order to feed this target glass to the further-processing system;

f) after the further-processing system has been brought to operating temperature, glass residues which are of a different type than the target glass, if any such residues are present, are displaced on an ongoing basis in the further processing system by the target glass supplied, until the target glass is produced with a sufficiently pure composition. A melting installation for carrying out the above-described method comprises at least one melting-down unit; central coolant circuits; means for feeding the melting-down unit with glass constituents of the desired composition which are to be melted; and a further-processing system for treating the melted glass, wherein the central coolant circuits have stationary connection locations for the coolant feed and for the coolant return, a number of skull crucibles are provided as mobile melting-down units, these crucibles each having connection locations which are carried with them for coolant feed and coolant return, and wherein the stationary connection locations and the connection locations which are carried along belonging to one of the skull crucibles cooperate with one another to act as coupling devices, in order to complete the coolant circuit when the skull crucible is introduced into the melting installation.

The melting installation used in the invention usually includes a melting platform which comprises all the media supply and discharge means, a melting-down unit, a refining unit and a homogenization and conditioning unit. The actual melting-down unit (the skull crucible) can be removed from the melting installation. A further melting-down unit, which is substantially filled with cold target glass B, is exchanged for the melting-down unit holding the starting glass A.

The invention is based, inter alia, on the fact that a skull crucible, filled with cold target glass, can be heated and made conductive by initial additional heating at one spot by means of a burner. This melting spot can be introduced into a high-frequency field and is in this way directly heated inductively and thereby widened. In this way, it is immediately possible to melt glass of a high quality. This results in the possibility of the device and method according to the invention, which allows very rapid melt changeover, in particular of high-purity, aggressive and high-melting glasses.

It is preferable to operate with a flying change between starting glass and target glass. For this purpose, the melt changeover process begins by lowering the glass level in the entire melting installation as far as possible. The glass can generally be completely drained out of the homogenization and conditioning unit. This results in a minimum amount of residual glass remaining in all the remaining parts of the installation (refining unit, homogenization and conditioning unit). Then, the high-frequency generator which heats the melting-down unit is switched off. The melting-down unit (skull crucible) is cooled by a medium. It is preferable for the medium cooling to be designed in such a way that the melting-down unit does not experience any interruption to the cooling through the entire change operation. This is achieved by the cooling-medium supply to the melting-down unit being changed immediately after the high-frequency energy has been switched off. For this purpose, the cooling-medium supply for the melting operation is switched over to a flexible cooling-medium supply for the cooling operation of the melting-down unit. With the flexible cooling-medium supply, the melting-down unit can be transported within the melting installation to a cooling position which is provided for this purpose, where it can be cooled to room temperature. At the same time, the new melting-down unit can be introduced into the melting installation and connected to the cooling-medium supply for the melting operation.

Like the cooling-medium supply, the electrical connections of the high-frequency coil and of the thermocouples in the melting-down unit are configured in such a way that they can quickly be detached.

The connections of the bubbling gas supply can likewise quickly be detached. The connection of the melting-down unit to the refining unit is configured in such a way that rapid disconnection of the connection is possible. Surprisingly, it has been found that for a connection between medium-cooled skull components and platinum units, all the way up to the maximum temperature of use, pressing these parts together by means of a clamping connection of the transition components is sufficient to ensure a seal with respect to molten glass.

This sealing effect is based on the skull crust which forms all the way into the transition region between skull crucible and platinum component and comprises solidified glass or crystal.

A melting-down unit (skull crucible) holding the target glass B is introduced at the melting-down position which has been vacated. This melting-down unit is connected to the cooling-medium supply, the high-frequency coil is connected to the generator, the clamping connection to the following melting unit is fitted and all the required thermocouples are connected up. After this work, the operation of melting the target glass can commence. A pool of melt is produced on the cold glass by means of additional heating from a burner. The high-frequency field can be introduced into this molten pool, so that the solid glass is heated. As the temperature of the molten material rises, it also becomes possible for ever increasing amounts of power to be absorbed from the HF field in the crucible. Within a few hours (depending on the grade of glass), the entire contents of the crucible have been melted. The following glass-carrying components can be brought to operating temperature during the phase of melting the new target glass. Once the operating conditions are satisfied in the melting-down unit and in the subsequent units, the process using the target glass B commences. The fact that only small residual quantities of the target glass A are present in the melting unit means that production of the target glass can commence after just a short run-in phase.

According to the invention, only one melting-down unit (skull crucible) is available for each glass which is to be melted. In the preferred version, there is a collection of skull crucibles holding the glasses to be produced, which are held in stock. No glass is lost in the melt changeover process. The frozen glass in the skull crucible is available again for the next melting process using this glass composition.

This is advantageous in particular for glasses with very expensive batches but very small batch sizes. This method makes it possible to produce small quantities of very high-quality glass in a quasi-continuous manner. As a result, it becomes economically viable to produce these glasses in many cases for the first time, and consequently new hot-forming methods, which have hitherto only been economical for a continuous production process, are also possible. These are in particular methods in which only continuous hot-forming allowed full loading of the hot-forming machines.

Since skull crucibles usually consist of stainless steel, copper or aluminum, their materials costs are significantly lower than those of the conventional platinum crucibles. Therefore, for economic reasons it is appropriate to construct a number of melting-down units for the special glasses, these units being held in stock holding the special glass in question so that they are available for a further melting process using the glass.

A combined method, in which a common skull crucible is used for similar glass families which can easily be changed over between one another, is also possible.

If, to achieve a certain glass specification, the starting point is a skull crucible in which glass of this specification is already present, there is no need for a long search to reach the desired specification from the starting specification which was previously produced by changing the composition of the glass batch supplied. A certain number of crucibles are held, and each of these crucibles has a defined glass composition, the use of skull crucibles being advantageous because they are inexpensive to produce and the molten glass is relatively unsusceptible to contamination from the crucible walls. After a certain heat-up time using a foreign source, a high-frequency field is introduced into the molten material which has been produced in the crucible, in order to drive the melting operation onward. This way of heating the glass melt is neutral in terms of the glass composition, which is desirable in particular in the case of aggressive glasses. The skull crucibles may have a relatively small melting volume of, for example, fifty or sixty liters, and with crucibles of this type it is possible to achieve relatively high throughputs of, for example, one tonne per day.

BRIEF DESCRIPTION OF THE DRAWINGS

The invention is described with reference to the drawings, in which.

DETAILED DESCRIPTION OF THE INVENTION

Figure 1:
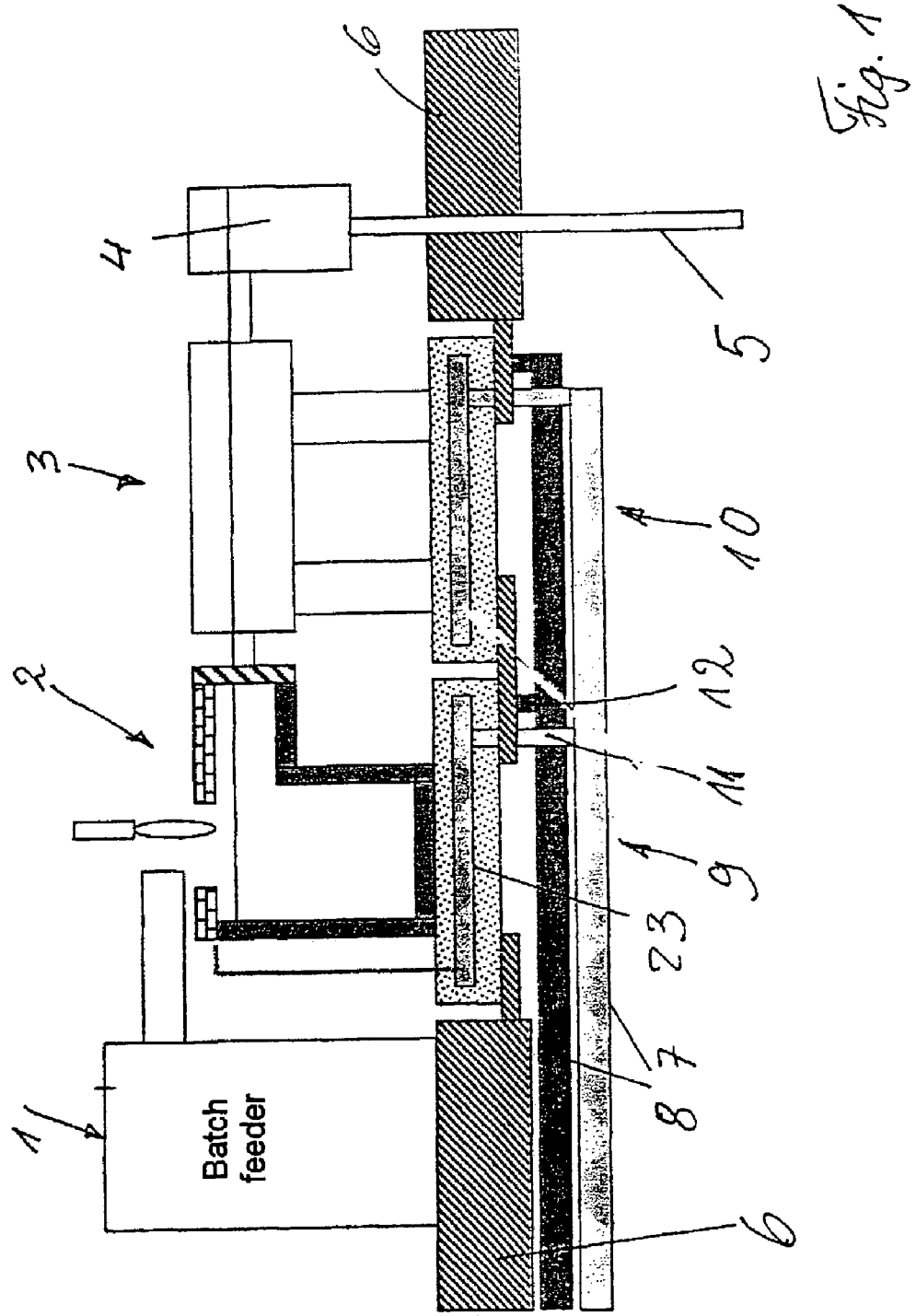
FIG. 1 shows a diagrammatic side view of a melting installation.

FIG. 1 shows the main components of a glass-melting installation, namely a melting-down unit 2, a batch feeder 1 connected upstream thereof, a refining unit 3 which is connected downstream of the melting-down unit, a homogenization unit 4 which is connected to the refining unit, and a conditioning unit 5. The melting installation has a stationary part, which is referred to as the frame 6 and in which central coolant circuits for the feed 7 and return 8 are provided. The frame forms two identical receiving locations 9 and 10 for the melting-down unit 2 and the refining unit 3. The receiving locations 9 and 10 each have stationary connection locations 11 for the coolant feed and stationary connection locations 12 for the coolant return. In the present context, the term "stationary" is to be understood as being a relative term, since adjustment movements to adapt to corresponding couplings of coolant connections 21, 22 of the melting-down unit 2 are possible.

Figure 2:
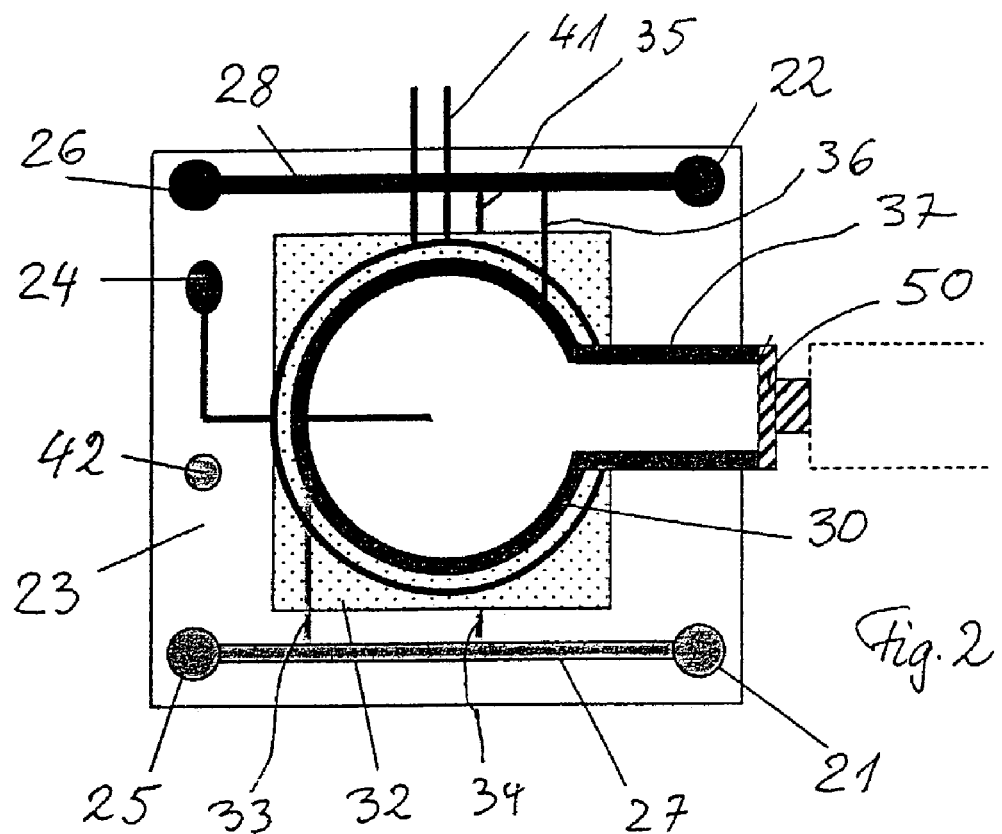
FIG. 2 shows a melting-down unit in accordance with the invention from above.
Figure 3:
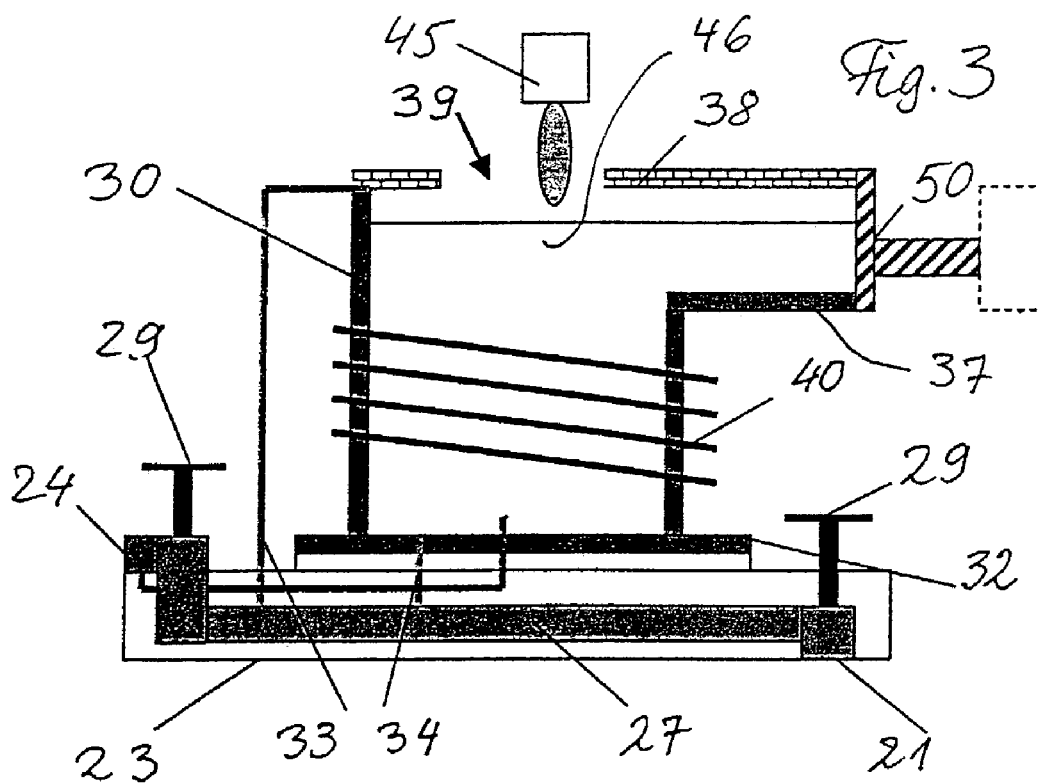
FIG. 3 shows the melting-down unit as seen from the side.

FIGS. 2 and 3 show a diagrammatic illustration of a melting-down unit as seen from above and from the side. The coolant connections 21 and 22 are positioned in a lower part or connection foot 23, in which distribution passages 27 of the coolant feed and distribution passages 28 of the coolant return extend. The coolant feed 27 also has a further connection 25 for a flexible coolant feed line, and the coolant return 28 also has a further connection 26 for a flexible coolant return line. A connection 24 for bubbling gas may be provided as a further line connection. The connections 21, 22, 24, 25, 26 are provided with shut-off valves, as indicated at 29 in FIG. 3, and the same is also true of the associated stationary connections, of which connections 11 and 12 are indicated in FIG. 1. The shut-off valves are required when exchanging melting-down units, as will be explained below.

As its main component, the melting-down unit 2 has a skull crucible 30, which mainly comprises coiled tubes through which coolant flows and which extends in the lateral casing 31 and the base 32 of the skull crucible. The cooling hoses are connected to the coolant feed 27 via branch lines 33, 34 and to the coolant return 28 via branch lines 35, 36. On the lateral casing 31 there is a passage-like overflow 37, to which the refining unit 3 or, if the latter is not present, the homogenization unit 4 are connected. The skull crucible 30 is closed off by a crucible cover 38 made from refractory material, in which there is an opening 39 which is used to feed the crucible with batch and for heating purposes.

The skull crucible 30 has an associated high-frequency coil 40, which surrounds the cylindrical casing 31 and has connections for high-frequency current. The connections 41 have plug connectors which are suitable for high frequencies and can be coupled to corresponding plug connectors which are positioned on power supply cables arranged in a stationary position.

The melting-down unit 2 also has a number of thermocouples, which are used to monitor operation and the position of which is not illustrated in detail. For these thermocouples there is a connection coupling 42, to allow the thermocouples to be connected to a stationary monitoring device and to disconnect this connection when the corresponding melting-down unit 2 is taken out of operation.

The melting installation also has a start-up burner 45, by means of which a gas flame can be directed through the opening 39 into the interior of the skull crucible 30, in order to produce a melting spot which forms a region 46 of sufficient conductivity.

Figure 4:
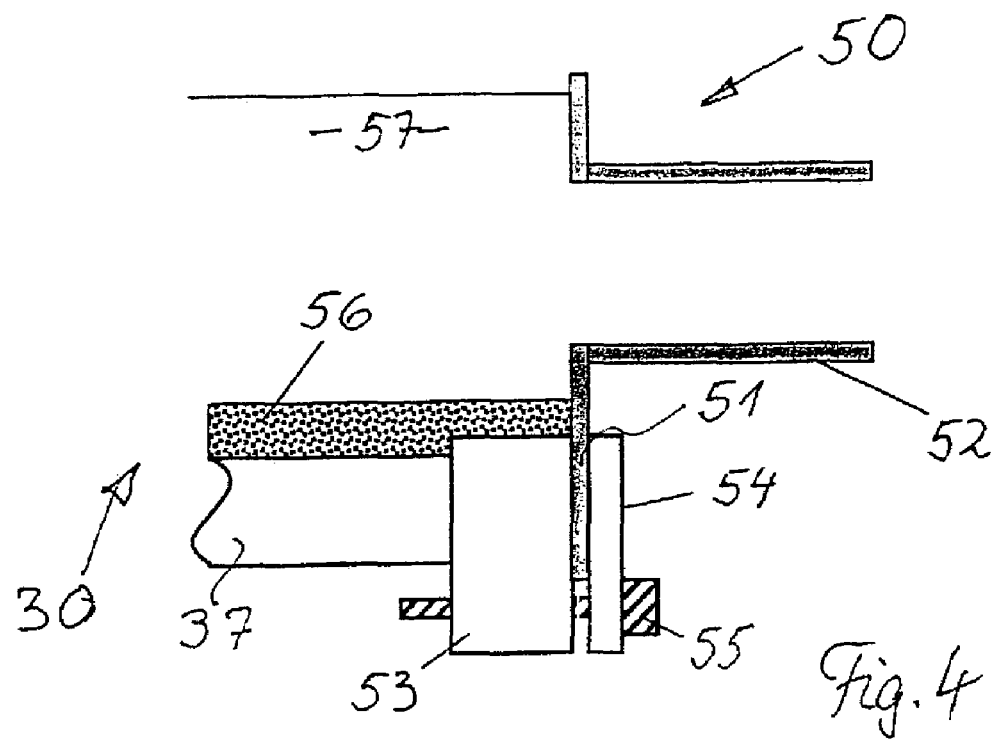
FIG. 4 shows a component connection in a melting installation.

FIG. 4 shows the connection of the skull crucible 30 to the further-processing system, which, by way of example, may include the refining unit 3 shown in FIG. 1. The component connection 50 comprises a flange 51 with an onward passage 52, which consist of platinum or an equivalent material. At the outlet passage 37 of the skull crucible there is a mating flange 53, against which the flange 51 of the passage 52 bears. A clamping plate 54 made from stainless steel or the like is pressed with metal screws 55 against the mating flange 53 of the skull crucible with the flange 51 between them. On account of the cooling of the skull crucible lateral casing, a crust 56 of glass is formed when, as illustrated, a glass melt 57 is present in the skull crucible 30. This crust seals any gaps which may be present between the flanges 51 and 53.

When the melt 57 has been drained out of the skull crucible, the crust 56 remains in place; however, it is sufficiently frangible, so that after the metal screws 55 and the locking flange 53 have been loosened, the skull crucible 30 can be removed from the melting installation.

Figure 5:
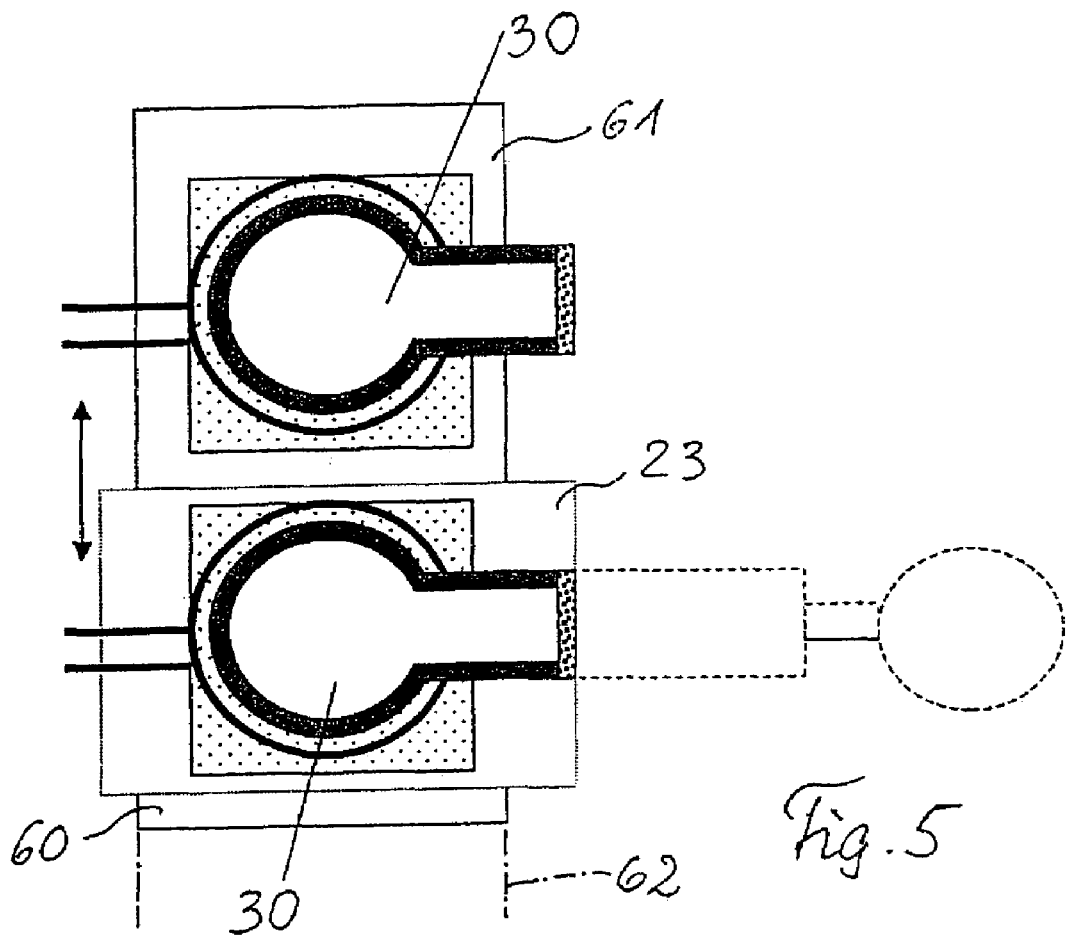
FIG. 5 shows a detail of the melting installation, as seen from above.

FIG. 5 shows this change operation in the form of a diagrammatic illustration. There is a displacement unit 60, on which the foot 23 of the melting-down unit 2 rests. After the high-frequency heating has been switched off, the cooling of the connection to the central coolant circuits 7, 8 can be interrupted and the connection to the flexible coolant return connections 25, 26 can be produced. Furthermore, the other couplings of the connections 24, 41, 42 are detached, in order to prepare the melting-down unit 2 for transport. Then, the melting-down unit can be displaced onto a cooling position 61. The location 9 in the melting installation which has been vacated can be filled by a new melting unit 2 with a new target glass.

As an alternative to a displacement unit, it is also possible to use a carousel or revolver for displacement of the melting-down units. In any case, it is possible for a preparation position 62 to be provided next to the cooling position 61, in order to carry out any preparation work for the new target glass which is to be used, for example in order to heat this glass to the operating temperature using the start-up burner 45. An installation configuration of this type allows the melt changeover time to be accelerated further.

The installation operates as follows:

After starting glass A has been substantially emptied out of the installation and the skull crucible holding the starting glass has been transferred to the cooling position 61, a skull crucible holding the target glass B is introduced into the installation. If the target glass has not yet been melted, the starting point is a skull crucible which has been filled with cutlet and batch of the desired composition. Then, the required connections for the coolant, the power supply and the monitoring sensors are produced. If this has not already happened, the melting-down unit is locally preheated by the gas burner 45, in order to produce a pool of melt which forms a region 46 of sufficient glass conductivity for electrical energy to be introduced in this region. This introduction of the electrical heating energy is effected using the high-frequency coil 40. The energy supplied gradually makes the entire contents of the skull crucible 30 melt, apart from edge regions which, on account of the cooling, to a certain extent remain in place as crucible walls. The batch feeder 1 is used to add fresh batch, which is melted down in the skull crucible. As a result, the melt level rises and the molten material flows over the outlet channel 37 into the further-processing system.

The further-processing system may, as illustrated, include a refining unit 3, a homogenization unit 4 and a conditioning unit 5. However, the entire melting installation is configured with a considerable degree of freedom, i.e. it is possible to vary the units which are connected in series at connection positions 9 and 10. For example, the melting-down unit for melting glasses with relatively low demands on the internal quality in particular of the bubble quality (e.g. soldering glasses) can also be operated without the refining unit 3. In this case, the melting-down unit is installed at position 10 and is directly connected to the conditioning unit 5. The batch feeder is placed on a plate which spans the position 9.

It is also possible to provide two melting-down units at positions 9 and 10; in such a case, the skull crucibles have a further inlet opening, which is not shown in FIGS. 2 and 3, is normally closed and is only opened during operation at location 10 of the installation.

In addition to the platinum tank described, it is also possible for refining chambers which are based on skull technology to be used as refining units. In this case, all the connections which have been described for working position 9 are provided.

The components which can be combined with one another have geometrically the same substructure or foot. The cooling medium supply is adapted to this for all components and can be used flexibly.

Application example:

Melt changeover by changing the melting-down crucible is of particular interest for use with colored glasses. With colored glasses, the melt changeover operation is complicated by the fact that, on the one hand, it takes a very long time for the remainder of the original glass to be discharged from the melting unit, in particular when changing from dark glasses to light glasses. On the other hand, with conventional burner heating, there are problems with the different absorption of radiation by the different colored glasses. In the case of the melt changeover of colored glasses by means of the HF technique, given sufficient conductivity of the glasses it is not expected that there will be any significant differences in the melting performance, even if the color of the glasses is very different. Changing the melting-down unit means that there is only a small volume which has to be exchanged. Consequently, the melt changeover time is significantly shortened.

We claim:

1. Method for changing glass compositions in continuously operated melting installations, comprising the following steps:
   a) a number of mobile melting-down units are made available which correspond to the number of glasses to be produced with the glass composition desired in each case, known as the target glasses, which melting-down units are provided with coupling devices so that they can be connected to and disconnected from the melting installation, the melting-down units, after use, still having glass residues comprising the target glass in question, which is available once again for the next melting process with the same or a similar target glass;
   b) the melting-down unit which has been selected in each case is used as part of the melting installation, the coupling devices of the melting-down unit being connected to those of the melting installation, in order to be able to carry out glass-melting operation and vessel-wall cooling, and a glass overflow is formed into a further processing system;
   c) the contents of the melting-down unit which has been fitted into the melting installation are locally preheated in order to create a region of sufficient glass conductivity, in which electrical energy can be introduced;
   d) the glass-melting operation with electrical energy being introduced is commenced with vessel-wall cooling taking place at the same time;
   e) the contents of the melting-down unit are supplemented by a batch having the composition of the target glass, and the glass-melting operation in accordance with step d) is continued in order to produce target glass and in order to feed this target glass to the further-processing system;
   t) after the further-processing system has been brought to operating temperature, glass residues which are of a different type than the target glass, if any such residues are present, are displaced on an ongoing basis in the further processing system by the target glass supplied, until the target glass is produced with a sufficiently pure, composition.

2. The method as claimed in claim 1,
   wherein in step c) a gas burner is used to produce a molten pool as local conductivity region in the glass of the melting-down unit.

3. The method as claimed in claim 1,
wherein in step d) high-frequency electrical energy is supplied, this energy being introduced into the local conductivity region, heating and increasing the size of the latter until the entire contents of the melting-down unit, apart from in the cooled vessel-wall region, has been melted.

4. The method as claimed in claim 1,
wherein a flying change is performed between molten starting glass and cold target glass, the melting-down unit holding the starting glass, after it has been emptied as far as possible, being connected to a mobile vessel wall cooling means, in order to be transported with the latter to a cooling site, while the melting-down unit holding the target glass is introduced into the melting installation at the vacated location.

5. A melting installation,
comprising:
at least one melting-down unit;
central coolant circuits;
means for feeding the melting-down unit with glass constituents of the desired composition which are to be melted; and
a further-processing system for treating the melted glass, wherein
the central coolant circuits have stationary connection locations for the coolant feed and for the coolant return,
a number of skull crucibles are provided as mobile melting-down units, these crucibles each having connection locations which are carried with them for coolant feed and coolant return, and wherein
the stationary connection locations and the connection locations which are carried along belonging to one of the skull crucibles cooperate with one another to act as coupling devices, in order to complete the coolant circuit when the skull crucible is introduced into the melting installation.

6. The melting installation for carrying out the method as claimed in claim 5,
wherein the coupling devices comprise connections for flexible lines, which are used to circulate cooling media after the skull crucible in question has been disconnected from the stationary melting installation during the transporting and storage of the skull crucible in question.

7. The melting installation for carrying out the method as claimed in claim 5,
wherein the coupling devices comprise electrical plug-connection features for a high-frequency coil of the skull crucible.

8. The melting installation for carrying out the method as claimed in claim 5,
wherein the coupling devices comprise electrical plug-connection features for temperature sensors of the skull crucible.

9. The melting installation for carrying out the method as claimed in claim 5,
wherein the coupling devices comprise quick-fit clamping connections for bubbling gas.

10. The melting installation for carrying out the method as claimed in claim 5,
wherein the coupling devices are arranged on a lower part of the skull crucible in question, which interacts in the manner of a plug connector with at least one crucible-receiving location of the stationary melting installation.

11. The melting installation for carlying out the method as claimed in claim 5,
wherein the skull crucible has a mating flange and a clamping device in order to enable a flange of a connected unit to be clamped securely in place and to enable the clamping to be released when the skull crucible is being changed.

12. The melting installation for carrying out the method as claimed in claim 10,
wherein a mounting location and dismantling location for the skull crucible is provided next to the crucible-receiving location, being connected to one another via a displacement unit in order for the skull crucible in question to be displaced from one location to the other.

* * * * *